Figure 1:
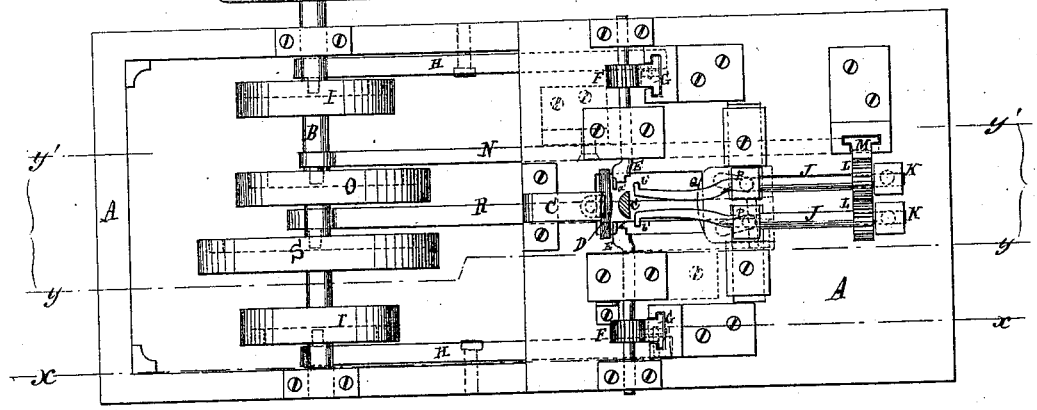

H. W. YERINGTON.
Making Wire-Fastenings for Bottle-Stoppers.

No. 164,246. Patented June 8, 1875.

Witnesses:
Gouverneur M. Thompson
Henry Grundy

Inventor:
Henry W. Yerington

2 Sheets--Sheet 2.
H. W. YERINGTON.
Making Wire-Fastenings for Bottle-Stoppers.
No. 164,246. Patented June 8, 1875.
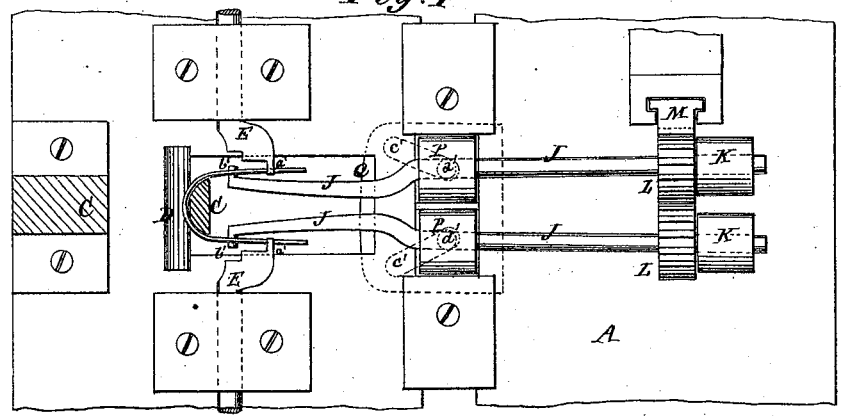
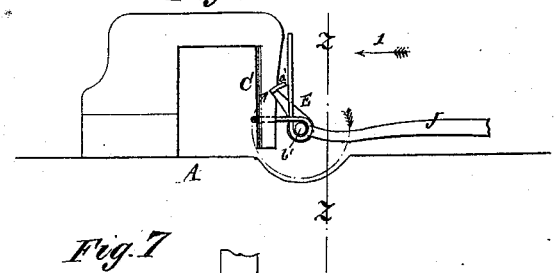
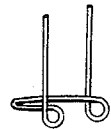
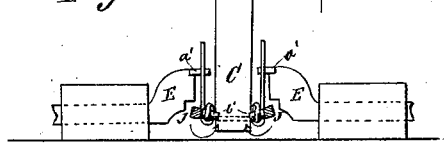
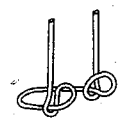
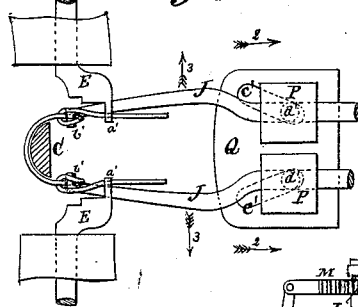
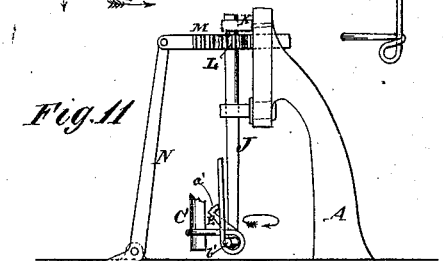
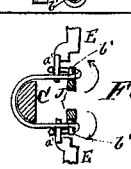
Witnesses:
Gouverneur M. Thompson
Henry Grundy
Inventor:
Henry W. Yerington
THE GRAPHIC CO. PHOTO-LITH. 39 & 41 PARK PLACE, N.Y.

UNITED STATES PATENT OFFICE.

HENRY W. YERINGTON, OF OCEANIC, NEW JERSEY, ASSIGNOR TO ROWLAND C. ANTHONY, OF NEW YORK CITY.

IMPROVEMENT IN MAKING WIRE FASTENINGS FOR BOTTLE-STOPPERS.

Specification forming part of Letters Patent No. 164,246, dated June 8, 1875; application filed April 17, 1875.

CASE B.

*To all whom it may concern:*

Be it known that I, HENRY W. YERINGTON, of Oceanic, in the county of Monmouth and State of New Jersey, have invented new and useful Improvements in Machinery for Making Neck-Bands for Bottle-Stopper Fastenings, of which the following is a specification:

This invention relates to machinery for making neck-bands adapted to fastenings or bails for holding the stoppers of bottles, especially bottles charged with an aerated liquid. These neck-bands surround the necks of the bottles, and afford bearings for the ends of such fastenings, permitting them to be swung on and off the stoppers to one side of the bottle, while they secure the fastenings to the neck of the bottle.

I prefer to make these neck-bands of wire, and in operating the machine which I have invented the wire is first fed into the machine and cut into pieces of the requisite length by any of the ordinary means. The piece of wire is held temporarily by a spring against a stationary semicircular or U-shaped die until released by two revolving loop-benders, one on each side of the die, which, in rotating, push back the spring, causing the wire to drop and lodge between the semicircular die and two cleats or projections, one on each of the benders. The wire held by the cleats is then bent by one revolution of the benders first around the curved surface of the die into a U shape, and next around toes formed on the ends of two twisting-rods, thus forming a loop on each leg of the wire, and leaving the remaining portions of the legs in an upright position. The benders now remain stationary, holding the wire supported on the toes firmly between the cleats and the die, while the twister-rods, with their toes in the loops, make, respectively, one-half of a revolution, until the toes are turned toward each other and the loops are twisted. The benders now make, respectively, one-quarter of a revolution, bending down the legs of the wire over the toes and into a horizontal position. This completes the neck-band. The twister-rods now move laterally apart, the toes receding from the loops, thus releasing the neck-band, which drops into a receptacle underneath the die.

Figure 2:
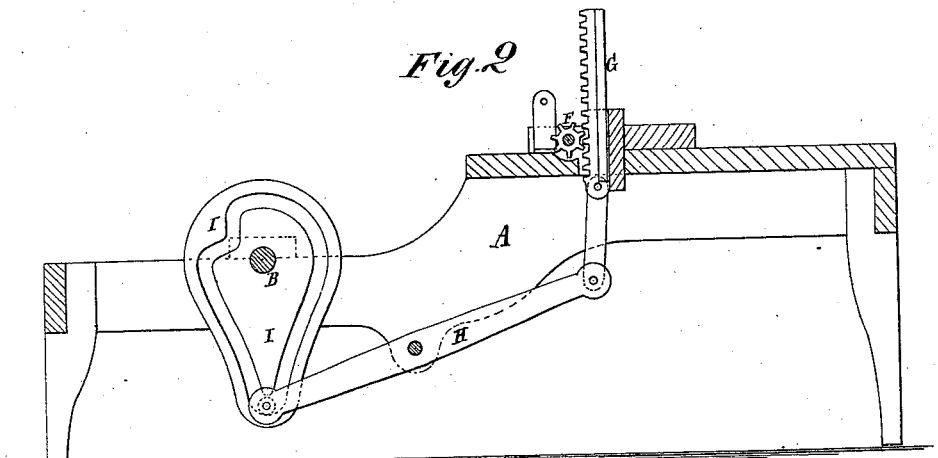
Figure 3:
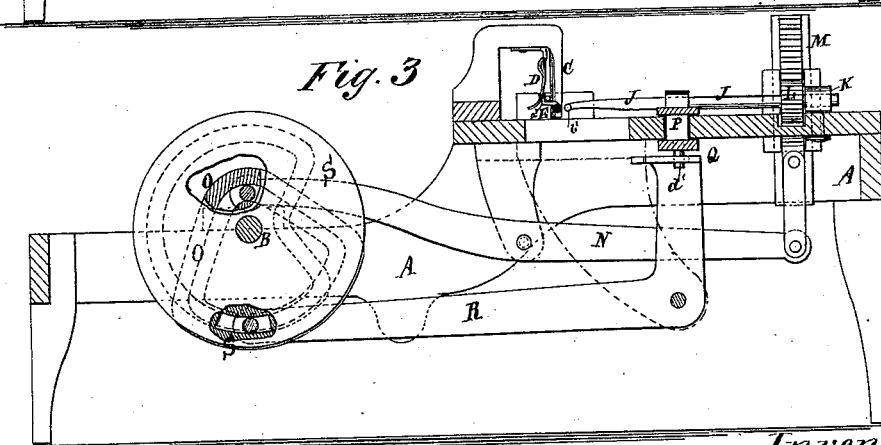

In the accompanying drawings making part of this specification, Figure 1 represents a plan view of my machine for making neck-bands. Fig. 2 represents a vertical section taken through the line $x\ x$ of Fig. 1. Fig. 3 shows a vertical section taken through the line $y\ y$ of Fig. 1, and including the parts situated between that line and the line $y'\ y'$. Fig. 4 shows a detailed plan view, illustrating the first operation on the cut wire, viz., the bending it into the form of the letter U. Fig. 5 shows a detailed sectional elevation of the part shown in Fig. 4, and illustrates the second operation, viz., forming the loops on the legs of the wire. Fig. 6 represents a perspective view of the wire as it appears after the second operation. Fig. 7 shows a detailed front view of the part represented in Fig. 5, (taken from the section-line $z\ z$, and seen in the direction of the arrow 1,) and illustrates the third operation, viz., the twisting of the loop for doubling the bearing-surface for the ends or gudgeons of the bail-wire. Fig. 8 represents a perspective view of the wire after undergoing the third operation. Fig. 9 shows a detailed plan view of the part represented in Fig. 7, and illustrates the fourth and last operation, viz., the bending down of the ends of the neck-wire to conform to the curve of the loop previously made, and cause its ends to project horizontally. Fig. 10 shows a perspective view of the neck-wire thus completed. Fig. 11 represents a detailed elevation of a modification in the position of the loop-twisting rods of the machine in the act of performing the third operation, or twisting the loop, which is done in a direction at right angles to that shown in Fig. 7, thereby producing a modified form of the neck-wire. Fig. 12 represents a detailed horizontal section of the modification illustrated in Fig. 11. Fig. 13 represents a side view of the neck-wire of the modified form, as made by the modification illustrated in Fig. 11. Fig. 14 shows a side view of the said modified form of the neck-wire after the fourth operation—that is, as completed.

The same letters of reference indicate the same parts in the several figures.

The main shaft B has its bearings in the frame A of the machine, and is provided with cams I I S O, placed in proper relative positions on the shaft B, and having grooves of proper construction to produce the different intermittent motions of the benders E E and twisters J J. The wire is introduced between the stationary U-shaped die C and the spring D, and there held until the benders E E, revolving in the direction indicated by the circular arrow in Fig. 5, push back the spring, as shown in Fig. 1. The journals of the wire-benders E E revolve in bearings on the frame A, and are provided with pinions F F, actuated by racks G G, which are linked to levers H H, which receive the proper intermittent motions from the cams I I. The wire, released by the benders E E, drops down between the die C and the cleats a a' of the benders E E, which grasp the wire and bend it round the die, by the revolution of the benders, into the U form, and then coil the legs of the wire round the toes b' b' of the twisters J J, and next bend the legs so that they stand vertical, as shown in Figs. 5, 7, and 11. Each of the twister-rods J J is provided, at its inner end, with the toe b', projecting at right angles to the twister, and the other ends of the twisters revolve in bearings K K, pivoted to the frame A, and are provided with pinions L L, gearing together, and revolved by the rack M, which is linked to the lever N, receiving the proper intermittent motion from the cam O. The twisters J J are supported about in the middle by the bearings P P, which are fitted in a slot in the frame A. The bearings P P are provided with pins d' d', one on each of the bearings, which project downward beneath the bed of the machine. These pins d' d' work in two slots, c' c', (see Fig. 4,) inclined to each other in the plate Q, placed beneath, and about parallel to, the bed of the machine, and secured to the lever R, (see Fig. 3,) by which the slotted plate Q receives the proper intermittent motion, reciprocating between the front and rear of the machine from the cam S.

As the plate Q reciprocates, the pins d' d' on the bearings P P, and, consequently, also the twisters J J, are moved either apart or toward each other, according as the plate Q, with the pins d' d' in its slots c' c', is moved backward or forward by the cam S and lever R. The twisters J J, with their toes b' b' in the coils formed in the legs of the wire, next act, the benders not moving, and they make one-half of a revolution downward and toward each other, as indicated by the arrows in Figs. 7, 11, and 12, and thus twist the coils in the legs of the wire, and bend the legs so that the coils stand above the plane of the U part of the wire, instead of below it, as before, and the form of the bends made in the coils and legs of the wire by the movement of the twisters and their toes produced by the rack M and pinions L L is shown in Figs. 7 and 8. The twisters are left by this movement with the ends of their toes turned toward each other, as shown in Figs. 7, 11, and 12, and they remain in this position while the benders next act upon the upright portions of the legs of the wire, which they bend into a nearly horizontal position by making one-quarter of a revolution forward and backward above the plane of the U part of the wire, as shown in Figs. 9 and 11. This completes the forming of the loops in the legs, and finishes the neck-bands in the forms shown in Figs. 10 and 14.

The modified form of the neck-band shown in Fig. 14 is produced by changing the direction of the twisters J J and their toes b' b' in twisting the coils in the legs of the wire. The twisters stand horizontal and their toes move in a vertical semicircle in forming the neck-band shown in Fig. 10; but in making the modified form shown in Fig. 14 the twisters stand vertical, and their toes move in a horizontal semicircle, as shown in Figs. 11 and 12. It remains to release the neck-bands from the twisters, which is effected by the movement of the slotted plate Q toward the rear of the machine, as indicated by the arrows 2 2 in Fig. 9, moving the pins d' d' to the opposite ends of the slots c' c', causing the twisters to slide apart laterally, as indicated by the arrows 3 3 in Fig. 9, and withdrawing the toes b' b' from the loops in the legs of the wire, when the neck-band drops from the machine by its own weight. By the further revolution of the shaft B, completing one revolution, the slotted plate Q is moved forward, and the twisters J J make one-half of a revolution, thus bringing the twisters and the toes b' b' into their original position, and the machine is ready to repeat the operation of making another neck-band.

What I claim as my invention, and desire to secure by Letters Patent, is—

1. The benders E E, provided with the cleats a a', in combination with the die C, and operated substantially as described.

2. The combination of the die C, the spring D, and the benders E E, operated substantially as described.

3. The combination of the benders E E with the toes b' b' of the twisting-rods J J, operated substantially as described.

HENRY W. YERINGTON.

Witnesses:
HENRY GRUNDY,
G. M. THOMPSON.